United States Patent [19]

Delsing

[11] Patent Number: 5,796,009

[45] Date of Patent: Aug. 18, 1998

[54] METHOD FOR MEASURING IN A FLUID WITH THE AID OF SING-AROUND TECHNIQUE

[76] Inventor: Jerker Delsing, Kungsljusvägen 56, S-240 21 Löddeköpinge, Sweden

[21] Appl. No.: 546,721

[22] Filed: Oct. 23, 1995

[30] Foreign Application Priority Data

Oct. 24, 1994 [SE] Sweden .......................... 9403632

[51] Int. Cl.$^6$ ...................................... G01F 1/66
[52] U.S. Cl. ......................... 73/861.28; 73/861.27
[58] Field of Search ....................... 73/861.27, 861.28, 73/861.29, 861.31, 170.07, 170.08, 170.09, 170.11, 170.12, 290 V

[56] References Cited

U.S. PATENT DOCUMENTS

| | | |
|---|---|---|
| 3,625,057 | 12/1971 | Yoshiyama et al. |
| 3,693,433 | 9/1972 | Kobori et al. ........................ 73/170.13 |
| 3,710,621 | 1/1973 | Asada .................................. 73/861.28 |
| 3,882,722 | 5/1975 | McShane. |
| 3,954,008 | 5/1976 | Yamamoto et al. |
| 3,974,693 | 8/1976 | Hardies. |
| 4,011,755 | 3/1977 | Pedersen et al. ..................... 73/861.28 |
| 4,308,754 | 1/1982 | Pedersen et al. ..................... 73/861.28 |
| 4,312,238 | 1/1982 | Rey .................................... 73/861.28 |
| 4,480,485 | 11/1984 | Bradshaw et al. ................... 73/861.28 |
| 4,542,656 | 9/1985 | Johnson .............................. 73/861.28 |
| 5,343,744 | 9/1994 | Ammann ............................. 73/170.13 |

FOREIGN PATENT DOCUMENTS

| | | | |
|---|---|---|---|
| 0 179 541 | 4/1986 | European Pat. Off. | |
| 0179541 | 4/1986 | European Pat. Off. | G01F 1/66 |

*Primary Examiner*—Ronald L. Biegel
*Attorney, Agent, or Firm*—Burns, Doane, Swecker & Mathis, L.L.P.

[57] ABSTRACT

During sing-around-type measurement in a fluid, a transmitter repeatedly transmits sound pulses in the fluid, and these sound pulses are received by a receiver, which acoustically is disposed opposite to the transmitter. The detection of the reception of a sound pulse at the receiver triggers the transmission of a subsequent sound pulse by the transmitter. In order to avoid any interference from multiple-reflected sound pulses, a delay is produced with the aid of the frequency of the received sound pulse, and the transmission of the subsequent sound pulse by the transmitter is triggered with this delay.

25 Claims, 2 Drawing Sheets

5,796,009

METHOD FOR MEASURING IN A FLUID WITH THE AID OF SING-AROUND TECHNIQUE

FIELD OF THE INVENTION

The present invention relates to a method for measuring in a fluid with the aid of sing-around technique, according to which a transmitter repeatedly transmits sound pulses in a fluid, and these sound pulses are received by a receiver, which acoustically is disposed opposite to the transmitter, the detection of the reception of a sound pulse triggering the transmission of a subsequent sound pulse by the transmitter.

BACKGROUND OF THE INVENTION

The invention further concerns a device that may be used in a measuring instrument of sing-around type.

The sing-around technique is a well-known technique used, among other things, for measuring flow and the velocity of sound. FIG. 1 illustrates the principle of sing-around-type measurement. Thus, a fluid having the velocity v flows in a tube 1 from the left to the right. On each side of the tube 1, there is provided an ultrasonic transducer 2 and 3, respectively, which forms an angle α with the longitudinal axis of the tube 1. The transducers 2, 3 are interconnected by means of sing-around electronics, which are schematically illustrated in the form of a box 4.

In order to measure the velocity v of the fluid in the tube 1, a sing-around loop is first established in the one direction, for instance the upstream direction, by the sing-around electronics 4 exciting the transducer 2 to transmit an ultrasonic pulse, which is received by the transducer 3 after passing through the fluid in the tube 1. When detecting that the transducer 3 is receiving an ultrasonic pulse, the sing-around electronics 4 excite the transducer 2 to transmit a new ultrasonic pulse. The thus-established sing-around loop is maintained for a predetermined number of turns N. Then, this procedure is repeated in the downstream direction.

The sing-around loop will oscillate with a certain period, which is referred to as the sing-around period and which depends on the sound velocity c in the fluid between the transducers, the distance L between the transducers, and the fluid velocity v. The sing-around period $t_1$ in the downstream direction is given by the formula $$t_1 = \frac{L}{c + v \cdot \cos \alpha}$$

and the sing-around period $t_2$ in the upstream direction is given by the formula $$t_2 = \frac{L}{c - v \cdot \cos \alpha}$$

If the distance L between the transducers and the angle α between the respective transducers and the tube are known and if the sing-around periods $t_1$ and $t_2$ are measured, the fluid velocity v can thus be calculated according to the formula $$v = \frac{L}{2 \cos \alpha} \left( \frac{1}{t_1} - \frac{1}{t_2} \right)$$

The fluid velocity v may be used for determining e.g. the flow rate of mass in the tube 1.

With the aid of the sing-around periods $t_1$ and $t_2$, the sound velocity c in the fluid may further be calculated according to the formula $$c = \frac{L}{2} \left( \frac{1}{t_1} + \frac{1}{t_2} \right)$$

In actual practice, the sing-around periods $t_1$ and $t_2$ are determined by measuring the time $T_1$ and $T_2$, respectively, it takes for the ultrasonic pulses to do N turns in the sing-around loops, and dividing it by N. When calculating the fluid velocity and the sound velocity, a time correction for the delays in the electronics has to be made, since $T_1 = N(t_1 + t_{d1})$ and $T_2 = N(t_2 + t_{d2})$, wherein $t_{d1}$ and $t_{d2}$ represent the delays in the electronics in respectively the downstream and the upstream direction.

One problem in this context is that the sing-around technique requires accurate time measurement as well as high time stability in the sing-around loop. For instance, measurement with an accuracy of 2% of a water-flow velocity of 3 cm/s when the transducer spacing is 55 mm requires a time measurement accuracy of 15 ps. Thus, the sum of the uncertainty of the time measurement technique and the uncertainty in the measuring signal due to noise should be lower than 15 ps.

The uncertainty in the measuring signal is due to external influences, such as turbulence in the fluid flow and temperature variations, as well as to noise and drift in the electronics. By using modern amplification techniques, noise and drift may be kept low enough to enable time accuracy on ps level.

As regards the time measurement, a time resolution better than one or a few ps can be achieved, for instance by resorting to high-speed CMOS technology.

By detecting the reception of the ultrasonic pulses with the aid of the zero crossings, sufficient time stability may further be achieved in the sing-around loop.

However, problems arise when the ultrasonic transmitter and the ultrasonic receiver are, from the point of view of acoustics, disposed opposite to each other, i.e. when they are so positioned that an ultrasonic signal can be reflected between them. A small part of the ultrasonic pulse transmitted by the transmitter will then be reflected first at the receiver and then at the transmitter, before being received by the receiver. This multiple-reflected sound pulse will be received at approximately the same time as that part of the last transmitted sound pulse which is received directly by the receiver, and will thus interfere therewith, making more difficult accurate detection of the pulse that is directly received.

FIG. 2A schematically illustrates how a directly received pulse D and a multiple-reflected pulse M are received over time in this case. As appears from the Figure, the receptions of the two pulses will partly coincide, and the pulses will thus interfere with each other. The interference will vary according to the sound velocity, the fluid velocity, the temperature, and so forth. The interference will have an uncontrollable adverse effect on the signal-noise ratio.

SUMMARY OF THE INVENTION

One object of the present invention therefore is to provide an improved sing-around method, which obviates the problems described above and, hence, enables measurement with a higher degree of accuracy as regards time.

Another object of the invention is to provide a device for implementing the method.

The problem concerning the interference from the multiple-reflected sound pulse can be solved by triggering the transmission of the subsequent sound pulse by the transmitter with a predetermined delay in relation to the detection of the reception of the sound pulse last transmitted. Delaying the transmission of the subsequent sound pulse entails a corresponding delay of the direct reception of this pulse, and if the delay is long enough, the multiple-reflected sound pulse and the directly received sound pulse will be separated over time, as appears from the time chart of FIG. 2B. Preferably, every directly received pulse is thus delayed. Basically, however, it is enough if every second directly received pulse is delayed, provided that the delay is long enough.

As mentioned in the foregoing, the time stability in the sing-around loop has to be very high, which means that the delay introduced has to be highly stable. However, it is extremely expensive to achieve such stability by means of conventional analogue delay lines. According to this invention, the delay is instead produced with the aid of the frequency of the received sound pulse. This enables the delay to be achieved in a less expensive fashion, involving but a few circuits which are easily integrated. Since the frequency of the sound pulse has a high stability, a very stable delay will in addition be obtained.

There are many different ways of producing the delay with the aid of the frequency of the received ultrasonic signal. One advantageous and easily-implemented way is to count the number of zero crossings in the received ultrasonic signal, the delay being set at a given number N of zero crossings. Similarly, the delay can be produced by detecting N voltage peaks in the received signal. It goes without saying that other levels in the signal may also be used.

Alternatively, the received signal may be employed as control signal to an oscillator circuit, for instance a phase-locked loop, in which the oscillator frequency, which is a multiple of the frequency of the received signal, controls a counter which determines the delay with a resolution corresponding to the oscillator frequency.

Another alternative may be to employ a phase detector, in which case the delay is set at a given number of whole periods plus 0–2π parts of a period.

In one mode of implementation of the invention, the time elapsing between the reception of the multiple-reflected sound pulse and the reception of the directly received sound pulse is measured. If this time changes, it is an indication that something has happened between the transmitter and the receiver. In some applications, there may, for instance, arise a coating on the walls of the tube. The measured time may then be used for monitoring the growth of the coating.

It should here be pointed out that the patent literature discloses the achievement of delays in sing-around loops. However, the known delays serve other purposes than that of the present invention and are in addition produced by other means.

U.S. Pat. No. 3,710,621 teaches a sing-around-type ultrasonic measuring instrument, in which a level detector senses a predetermined level in the received signal and, via a control signal generator circuit, opens a gate, which also receives the received signal, during a predetermined time. The output signal from this gate is supplied to a DC smoother circuit, from which is obtained a direct voltage signal, which is used for stabilising the amplitude of the received signal, thus preventing it from varying. The control signal generator circuit further delays the transmission of the subsequent ultrasonic pulse for a time corresponding to the time the above gate is kept open. In the US patent, the purpose of this delay is said to be to prevent simultaneous transmission of a signal and reception of a signal, which in turn is meant to ensure more stable detection of the amplitude of the received signal than would be the case if the transmitted signal and the received signal occurred simultaneously. The control signal generator circuit may, for instance, be a monostable circuit. The uncertainty as regards the point of time when the circuit switches over today is on nanosecond level.

U.S. Pat. No. 3,974,693, U.S. Pat. No. 3,882,722 and U.S. Pat. No. 3,954,008 disclose ultrasonic flow meters having two simultaneous sing-around loops. In these ultrasonic flow meters, the start of the one loop is delayed in relation to that of the other loop, so as to prevent simultaneous reception and transmission. Thus, it is not a question of delaying the transmission of a pulse in relation to the reception of a pulse in one and the same sing-around loop.

U.S. Pat. No. 3,625,057 teaches an ultrasonic flow meter having two sing-around loops, each of which comprises a delay circuit with adjustable delay. This delay is used for producing different sing-around frequencies in the two loops when the fluid velocity is zero.

BRIEF DESCRIPTION OF THE DRAWINGS

One embodiment of the invention will now be described in more detail with reference to the accompanying drawings, in which FIG. 1, which has been discussed already in the foregoing, is a schematic view illustrating the principle of the sing-around technique, FIGS. 2A and 2B, which also have been discussed in the foregoing, illustrate how the receptions of a directly received pulse and a multiple-reflected pulse take place over time in accordance with the prior art and in accordance with the invention.

DESCRIPTION OF THE PREFERRED EMBODIMENT

Figure 1:
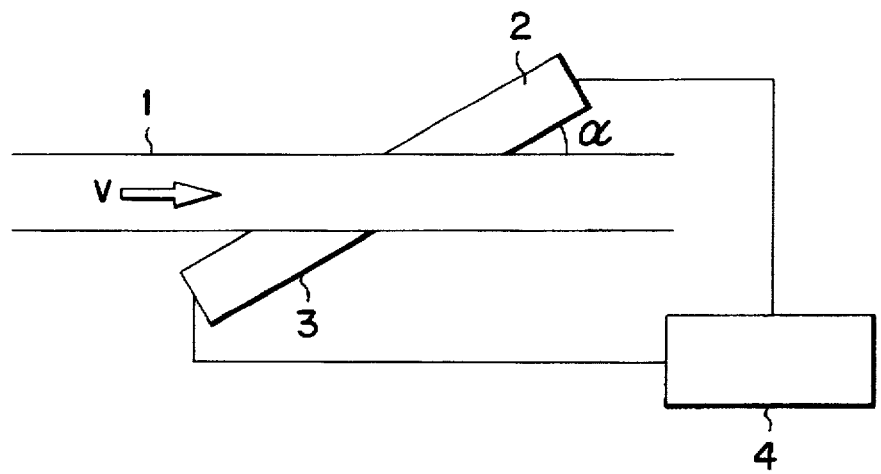
Figure 2A:
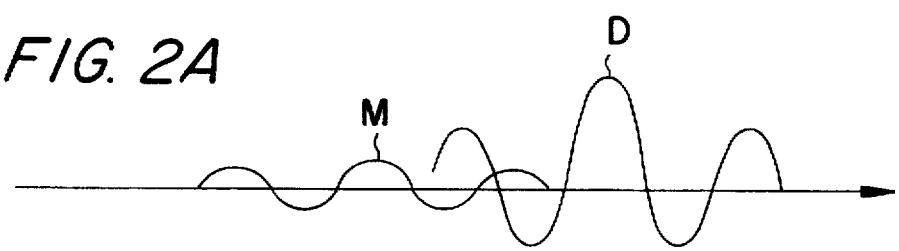
Figure 2B:
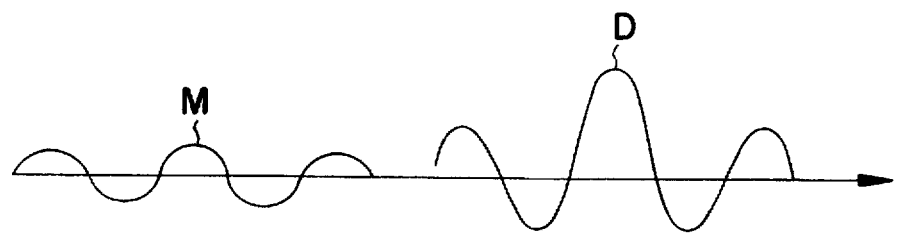
Figure 3:
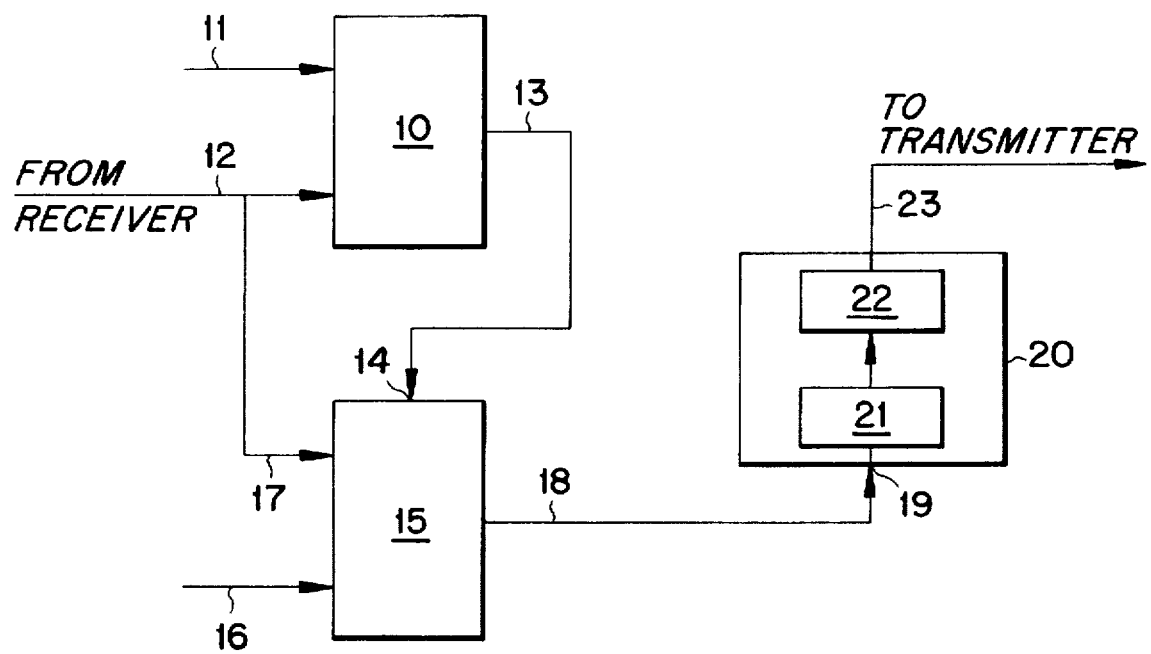
FIG. 3 is a block diagram illustrating an embodiment of the invention and shows how a delay is produced in a sing-around circuit, FIG. 4a graphically shows a signal at a second input of a first comparator according to an embodiment of the present invention, FIG. 4b graphically shows a signal at an output of a first comparator according to an embodiment of the present invention, FIG. 4c graphically shows a signal at an output of a second comparator according to an embodiment of the present invention, and FIG. 4d graphically shows an exciting signal at an output of a delay circuit according to an embodiment of the present invention.

Thus, FIG. 3 shows an arrangement of electronic circuits forming part of a sing-around loop. This arrangement is connected between a receiver and a transmitter in the sing-around loop. The input signal to the arrangement consists of the signal received by the receiver, and the output signal from the arrangement consists of an exciting signal to the transmitter.

To be more specific, this arrangement comprises a first comparator 10, which has a first input 11 for a reference-level signal and a second input 12 connected to the ultrasonic receiver in the loop, optionally by the intermediary of amplifiers (not shown). Furthermore, the first comparator 10 has an output 13, which is connected to a first input 14 of a second comparator 15, which has a second input 16 for a reference-signal level and a third input 17 connected to the ultrasonic receiver in the loop. Moreover, the second comparator 15 has an output 18, which is connected to an input 19 of a delay circuit 20. This delay circuit 20 comprises a counter 21 and a signal-conditioning circuit 22 and has an output 23, which is connected to the ultrasonic transmitter in the sing-around loop.

Figure 4A:
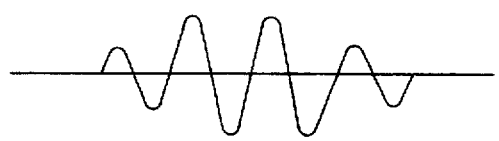

The arrangement shown in FIG. 3 operates as follows. When the receiver in the sing-around loop receives an ultrasonic signal, this signal is amplified and fed to the second input 12 of the first comparator 10. The appearance of the signal at the second input 12 is shown in FIG. 4a. As appears from this Figure, the signal is sinusoidal. The signal amplitude first increases and then decreases. The number of periods of the signal may vary and depends upon the ultrasonic transmitter and its surroundings.

Figure 4B:

The first comparator 10 compares the amplitude of the received ultrasonic signal with the reference-signal level at the first input 11. Conveniently, the reference-signal level is set at a level well above normal noise levels and above the amplitude of the multiple-reflected signal. When the amplitude of the received ultrasonic signal is equal to the reference level, the first comparator 10 sets its output signal at a logically positive level, as shown in FIG. 4b.

Figure 4C:
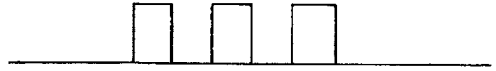

The logically positive output signal at the output 13 of the first comparator 10 activates the second comparator 15, causing it to compare the ultrasonic signal at its third input 17 with a zero reference at its second input 16 in order to find zero crossings in the ultrasonic signal. For each zero crossing found, the state at the output 18 of the second comparator 15 is altered so that a pulse-shaped signal is obtained, in which each edge indicates a zero crossing. The appearance of this signal is shown in FIG. 4c.

Figure 4D:

The output signal from the second comparator 15 is supplied to the input 19 of the counter 21, which counts a predetermined number of pulses in this signal. When the predetermined number of pulses has been attained, a signal is transmitted to the signal-conditioning circuit 22, which shapes the signal in suitable fashion and emits an exciting signal, as shown in FIG. 4d, at the output 23 of the delay circuit 20, which here thus constitutes an exciting means. When the exciting signal passes to a logically negative level, also the output signal from the first comparator 10 is set at a logically negative level, such that the second comparator 15 is disabled until the first comparator again detects that a signal is being received.

The exciting signal supplied to the transmitter in the sing-around loop is thus delayed with a predetermined number of zero crossings in relation to the reception of the latest ultrasonic signal by the receiver in the sing-around loop. Owing to this delay, the sing-around period is prolonged. However, the delay does not affect the period time of an ultrasonic signal reflected between the transmitter and the receiver. Accordingly, it will take more time for a pulse to do two turns in the sing-around loop than it will take for one pulse to be reflected once between the transmitter and the receiver, which in turn means that these two pulses will be separated over time. As a result, the uncertainty of the directly received signal is reduced, enabling higher stability in the loop and more accurate time determination.

The number of pulses constituting a delay depends on the application and can be set separately for each application. Normally, the number of pulses is in the range 1–200, which thus corresponds to ½–100 periods of the received sound pulse. The delay should at least equal half the length of the multiple-reflected signal in order that the directly received signal should be separated from the multiple-reflected signal if the delay is produced upon reception of each directly received pulse.

In one advantageous embodiment of the invention, the arrangement shown in FIG. 3 may further comprise a circuit for measuring the time elapsing between the reception of a direct ultrasonic pulse and the reception of a multiple-reflected ultrasonic pulse. The time difference T between the receptions of these signals is given by the following formula $$T = 2\left( \frac{L_{b1}}{C_{b1}} + \frac{L_{b2}}{C_{b2}} + t_d \right)$$

wherein $L_{b1}$ and $L_{b2}$ represent the thickness of a coating, if any, found on respectively the first and the second wall, $c_{b1}$ and $c_{b2}$ represent the sound velocity in the respective coatings, and $t_d$ is the delay produced by the circuits illustrated in FIG. 3.

As appears from the formula indicated above, an alteration of the time difference T may indicate an alteration of the thickness of the coatings found on the tube walls where the measurement is carried out.

The multiple-reflected pulse can be detected by means of a circuit, which corresponds to the first comparator 10 in FIG. 3 but which receives a reference-signal level that is adapted to the amplitude of the multiple-reflected pulse. The time difference T between the multiple-reflected pulse and the directly received pulse can be measured by a conventional timer, which receives the output signal from the above circuit with a view to detecting the multiple-reflected pulse and the output signal from the first comparator 10 as input signals.

Although the above description bears upon an example involving sing-around equipment using ultrasound, which is the most common case, it goes without saying that the invention may just as well be implemented in sing-around applications using sound of some other frequency.

Finally, it should be pointed out that the device according to the invention also may be employed in pulse-echo measurement when sing-around techniques are resorted to. If so, the transmitter and the receiver are, as a rule, arranged in one and the same unit.

What I claim and desire to secure by Letters Patent is:

1. A method for measuring in a fluid with the aid of a sing-around technique, according to which a transmitter repeatedly transmits sound pulses comprising at least two sound periods in the fluid, and these sound pulses are received by a receiver, which acoustically is disposed opposite to the transmitter, the detection of the reception by the receiver triggering the transmission of a subsequent sound pulse by the transmitter, wherein, at the time of each or every second reception of a sound pulse, a delay is produced, and the transmission of the subsequent sound pulse by the transmitter is triggered with this delay, the delay avoiding interference between a directly received sound pulse and a multiple-reflected sound pulse and the delay equaling at least half the length of the multiple-reflected sound pulse, wherein the delay between reception of the sound pulse and transmission of the subsequent sound pulse is established as a function of the frequency of the received sound pulse.

2. A method as claimed in claim 1, wherein said delay is produced by counting a predetermined number of zero crossings in the received sound pulse.

3. A method as claimed in claim 2, wherein the delay is 1–100 times the sound period time of the sound pulse.

4. A method as claimed in claim 2, wherein the sound pulses employed are ultrasonic pulses.

5. A method as claimed in claim 1, wherein the delay is 1–100 times the sound period time of the sound pulse.

6. A method as claimed in claim 1, wherein the sound pulses employed are ultrasonic pulses.

7. A method for measuring in a fluid with the aid of a sing-around technique, according to which a transmitter repeatedly transmits sound pulses comprising at least two sound periods in the fluid, and these sound pulses are received by a receiver, which acoustically is disposed opposite to the transmitter, the detection of the reception by the receiver triggering the transmission of a subsequent sound pulse by the transmitter, wherein, at the time of each or every second reception of a sound pulse, a delay is produced with the aid of the frequency of the received sound pulse, and the transmission of the subsequent sound pulse by the transmitter is triggered with this delay, the delay avoiding interference between a directly received sound pulse and a multiple-reflected sound pulse and the delay equaling at least half the length of the multiple-reflected sound pulse, wherein the time elapsing between the reception of a multiple-reflected sound pulse and the reception of a directly received sound pulse is measured.

8. A method as claimed in claim 7, wherein the measured time between the reception of a multiple-reflected sound pulse and the reception of a directly received sound pulse is used for assessing the thickness of a coating between the fluid and respectively the transmitter and the receiver.

9. A method as claimed in claim 7, wherein the delay is produced by counting a predetermined number of zero crossings in the received sound pulse.

10. A method as claimed in claim 7, wherein the delay is 1–100 times the sound period time of the sound pulse.

11. A method as claimed in claim 7, wherein the sound pulses employed are ultrasonic pulses.

12. In a measuring instrument of sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein the delay between reception of the sound pulse and transmission of the subsequent sound pulse is established as a function of the frequency of the received sound pulse.

13. A device as claimed in claim 12, wherein the delay means comprises a counter.

14. A device as claimed in claim 13, wherein zero-crossing-detecting means have one input from the receiver and one output to the counter and are adapted to detect zero crossings in the sound pulses received by the receiver.

15. In a measuring instrument of sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay with the aid of the frequency of the received sound pulse, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein time meters are adapted to measure the time elapsing between the reception of a multiple-reflected sound pulse and the reception of a directly received sound pulse.

16. In a measuring instrument of sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay with the aid of the frequency of the received sound pulse, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein the delay means comprises a counter, wherein time meters are adapted to measure the time elapsing between the reception of a multiple-reflected sound pulse and the reception of a directly received sound pulse, the directly received sound pulse being part of a sound pulse transmitted by the transmitter and directly received by the receiver, and the multiple-reflected sound pulse being part of a sound pulse transmitted by the transmitter and reflected first at the receiver and then at the transmitter and thereafter received by the receiver.

17. In a measuring instrument of sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay with the aid of the frequency of the received sound pulse, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein the delay means comprises a counter, wherein zero-crossing-detecting means have one input from the receiver and one output to the counter and are adapted to detect zero crossings in the sound pulses received by the receiver, wherein time meters are adapted to measure the time elapsing between the reception of a multiple-reflected sound pulse and the reception of a directly received sound pulse.

18. A device as claimed in claim 17, wherein the reception-detecting means comprise a first comparator having a first input at which a reference signal is received, a second input which is connected to the receiver, and an output which is connected to the zero-crossing-detecting means.

19. In a measuring instrument of sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay with the aid of the frequency of the received sound pulse, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein the delay means comprises a counter, wherein zero-crossing-detecting means have one input from the reciever and one output to the counter and are adapted to detect zero crossings in the sound pulses received by the receiver, wherein the reception-detecting means comprises a first comparator having a first input at which a reference signal is received, a secon dinput which is connected to the receiver, and an output which is connected to the zero-crossing-detecting means.

20. A device as claimed in claim 12, wherein the delay means comprises an oscillator circuit.

21. In a measuring instrument of sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay with the aid of the frequency of the received sound pulse, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein the delay means comprises a phase detector.

22. A measuring instrument of a sing-around type comprising a transmitter, which is adapted to repeatedly transmit sound pulses comprising at least two sound periods in a fluid, and a receiver, which is adapted to acoustically be disposed opposite to the transmitter and to receive the sound pulses transmitted by the transmitter, wherein the measuring instrument comprises delay means which are adapted to produce a delay, so as to cause the excitation of the transmitter by the exciting means to be delayed with this delay, the delay avoiding interference between a directly received sound pulse and a multiple-reflected sound pulse and the delay equaling at least half the length of the multiple-reflected sound pulse, wherein the delay between reception of the sound pulse and transmission of the subsequent sound pulse is established as a function of the frequency of the received sound pulse.

23. A measuring instrument as claimed in claim 22, wherein the delay means comprises a counter.

24. A method for measuring in a fluid with the aid of a sing-around technique, according to which a transmitter repeatedly transmits sound pulses in the fluid, and these sound pulses are received by a receiver, which acoustically is disposed opposite to the transmitter, the detection of the reception by the receiver triggering the transmission of a subsequent sound pulse by the transmitter, wherein, at the time of each or every second reception of a sound pulse, a delay is produced with the aid of the frequency of the received sound pulse, and the transmission of the subsequent sound pulse by the transmitter is triggered with this delay, wherein part of a sound pulse transmitted by the transmitter is received directly by the receiver as a directly received sound pulse, part of said sound pulse is reflected first at the receiver and then at the transmitter and thereafter is received at the receiver as a multiple-reflected sound pulse, and the time elapsing between the reception of a multiple-reflected sound pulse and the reception of a directly received sound pulse is measured.

25. In a measuring instrument of sing-around type comprising a transmitter, which is adapted to repeatedly transmit sound pulses in a fluid, and a receiver, which is adapted to acoustically be disposed opposite to the transmitter and to receive the sound pulses transmitted by the transmitter, said device comprising reception-detecting means for detecting the reception of a sound pulse by the receiver, and exciting means which are adapted, in response to the detection by the reception-detecting means of the reception of a sound pulse, to excite the transmitter to transmit a sound pulse, a device comprising delay means which are adapted to produce a delay with the aid of the frequency of the received sound pulse, so as to cause the excitation of the transmitter by the exciting means to be delayed with this delay, wherein time meters are adapted to measure the time elapsing between the reception of a multiple-reflected sound pulse and the reception of a directly received sound pulse, the directly received sound pulse being part of a sound pulse transmitted by the transmitter and directly received by the receiver, and the multiple-reflected sound pulse being part of a sound pulse transmitted by the transmitter and reflected first at the receiver and then at the transmitter and thereafter received by the receiver.

* * * * *